Dec. 18, 1923.                                                                1,478,133
L. MILLET
GAS METER WITH SWINGING BELL SHAPED MEMBER
Filed Oct. 23, 1920                   4 Sheets-Sheet 1

Inventor
L. Millet,
By H. R. Kerslake.
Attorney

Dec. 18, 1923.  1,478,133
L. MILLET
GAS METER WITH SWINGING BELL SHAPED MEMBER
Filed Oct. 23, 1920    4 Sheets-Sheet 2

Inventor
L. Millet,
By H. R. Kerslake
Attorney

Dec. 18, 1923. 1,478,133
L. MILLET
GAS METER WITH SWINGING BELL SHAPED MEMBER
Filed Oct. 23, 1920    4 Sheets-Sheet 3

Inventor
L. Millet,
By H. R. Kerslake
Attorney

Dec. 18, 1923.                                               1,478,133
                        L. MILLET
          GAS METER WITH SWINGING BELL SHAPED MEMBER
                   Filed Oct. 23, 1920            4 Sheets-Sheet 4
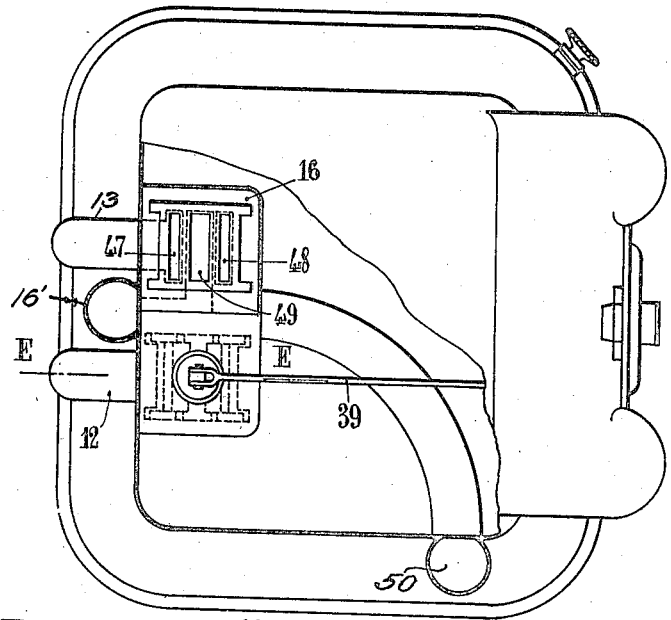
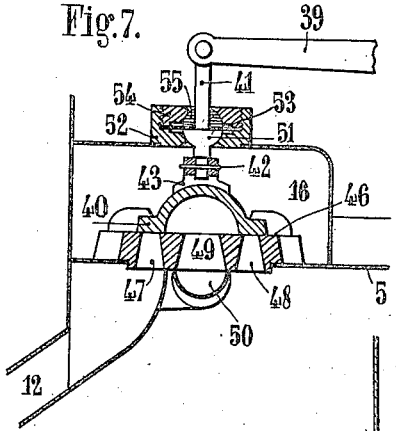
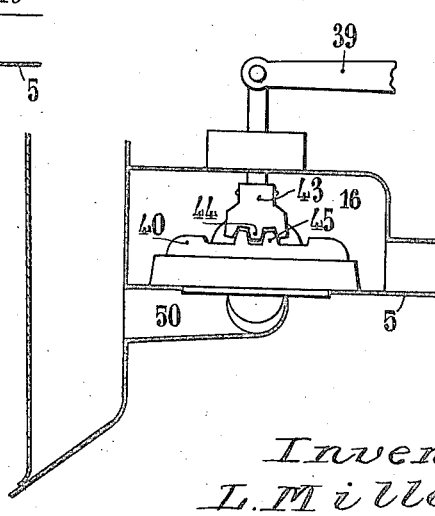
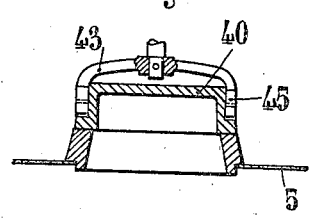

Patented Dec. 18, 1923.

1,478,133

UNITED STATES PATENT OFFICE.

LAURENT MILLET, OF PARIS, FRANCE, ASSIGNOR TO COMPAGNIE POUR LA FABRICATION DES COMPTEURS ET MATERIEL D'USINES-A GAZ, OF PARIS, FRANCE.

GAS METER WITH SWINGING BELL-SHAPED MEMBER.

Application filed October 23, 1920. Serial No. 418,991.

*To all whom it may concern:*

Be it known that LAURENT MILLET, citizen of the French Republic, whose residence is Paris, France, has invented certain new and useful Improvements in Gas Meters with Swinging Bell-Shaped Members, of which the following is a specification.

It is a well known fact that gas meters, in order to pass the official examination, are required to make proof of their capacity to effect the metering of the gas with a constant and clearly evident precision.

In order to obtain this result, meters have been devised which contain one or more bell shaped members, each of which constitutes a measuring receptacle cooperating with a system of distributing members which regulate the inlet and discharge of the gas, whereby each pulsation of the apparatus will deliver a determined volume of gas, but none of these meters appear to have been adopted in current practice by reason of the considerable number of inconveniences exhibited therein and resulting from their defective design. In fact, the constructors of these apparatus went no further than to adopt valve distribution devices identical with or comparable to those which are employed for dry meters in which the distributing members are for the greater part in permanent contact with the gases and the emanations from the liquids contained in the meters, while the remaining parts are insufficiently protected against such contact by stuffing boxes which can neither be refilled or lightened and are subject to a rapid loss of their tightness, thus allowing gas to enter the portions of the apparatus to which it should not have access. This gives rise not only to a direct flow of gas which is not metered, but also, by reason of the action of the gas and of the said emanations, to an alteration of the members which occasions abnormal resistance effects friction, gripping and wear having a prejudicial action upon the precision and the duration of the meters.

Moreover, the dispositions adopted in the already known types of meters containing bell shaped members do not permit of obtaining the perfect balancing of the bell shaped members and other moving parts, which condition is essential to secure the proper operation of the apparatus.

This invention relates to a gas meter with swinging bell shaped members the special dispositions whereof constitute considerable improvements, inasmuch as they obviate the hereinbefore mentioned inconveniences of the usual gas meters. The present gas meter is characterized by the cooperative action of the bell shaped members in connection with the system of valve distribution, and by the use of special valves, flexible diaphragms and distributing members forming an ensemble of parts which are perfectly balanced in all their positions and susceptible of motion in an easy manner and without shocks and without having any portion of the meter other than the measuring receptacles and the passages or spaces traversed by the gas between the distributing valves and the said receptacles, submitted at any moment to the contact of the gas or of the emanations from the liquid contained in the apparatus.

The accompanying drawings show by way of example an embodiment of this invention.

Fig. 3 is a vertical cross section on the line B—B Fig. 2.

Fig. 6 is a plan view showing the distributing mechanism, the walls of the distribution casing being removed, together with one of the valves, for the purpose of showing one of the valve slideways.

Fig. 7 is a separate view on a larger scale of one of the distributors in vertical cross section.

Figs. 8 and 9 show respectively in exterior side view and in longitudinal section the operating members of the slide valve actuating mechanism.

Figure 1:
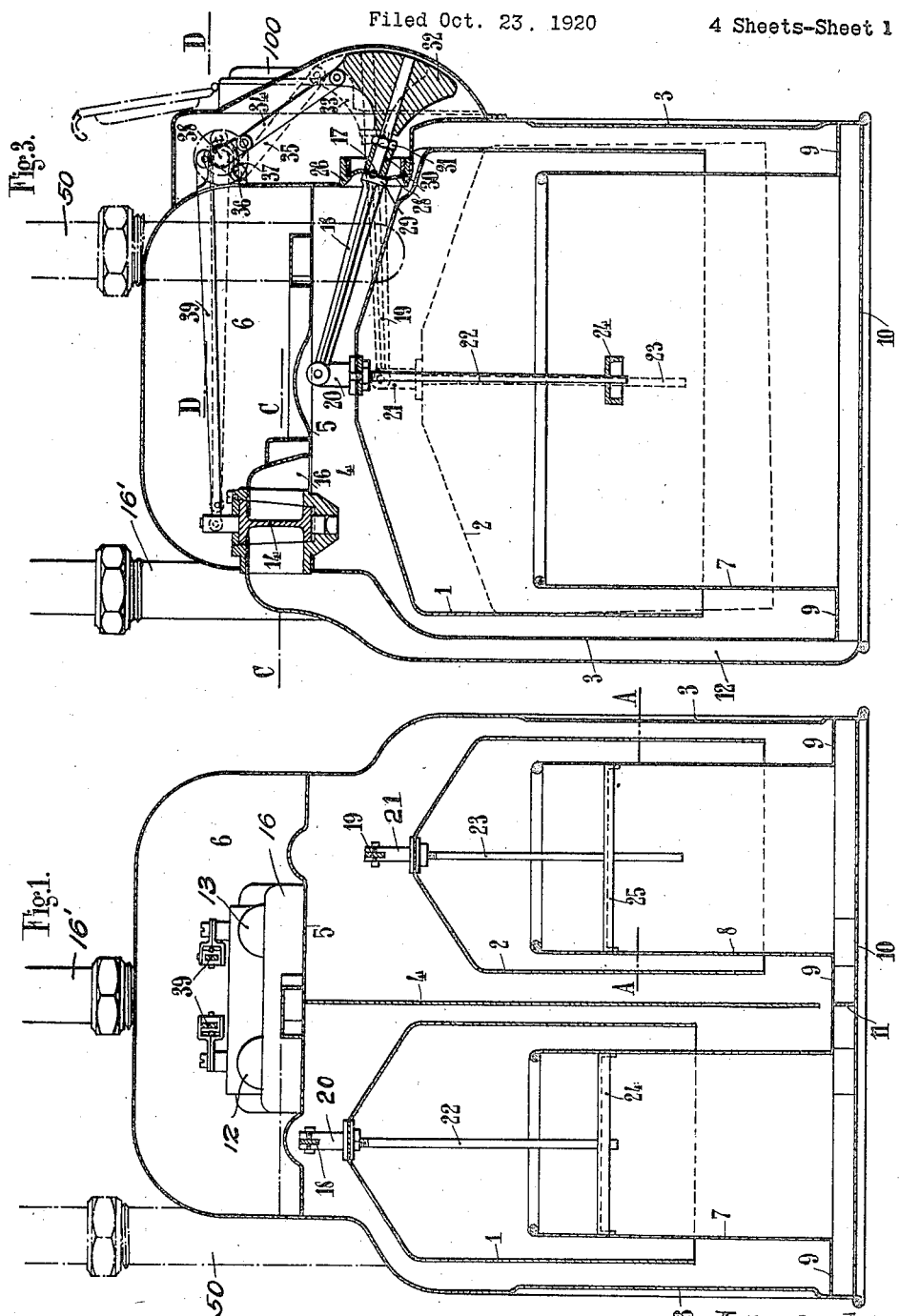
Fig. 1 represents a longitudinal section of the ensemble of the gas meter.
Figure 2:
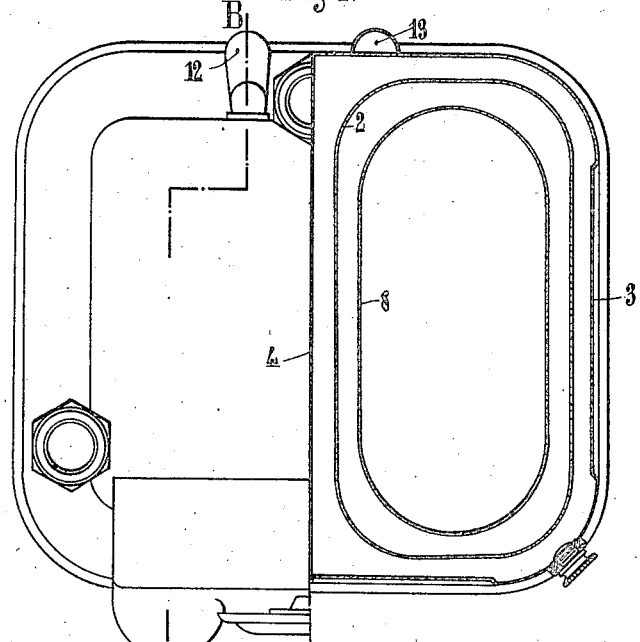
Fig. 2 is a plan view of the same with a portion in horizontal section on the line A—A, Fig. 1.

The present gas meter comprises two bell shaped members 1, 2, immersed in water or like liquid, provided in sufficient quantity to keep the bottom edge thereof in all cases below the level of the liquid. Said bell shaped members are adapted to move within the receptacles constituted by the outer casing 3 of the gas meter, which is divided for this purpose by a middle partition 4 secured to a horizontal wall 5 which forms in the upper part of the meter a chamber 6 entirely separated from all contact with the gas or the vapors which may rise from the liquid and having operating therein the different members actuating the gas distribution device and the mechanism for recording the volume of gas, which latter is designated at 100.

The receptacle for containing the liquid is limited in each of the compartments by the jackets 7 and 8 which constitute together with the outer casing two spaces of annular section adapted to contain the liquid, and having moving therein the said bell-shaped members. The said jackets are disposed upon a disk 9 mounted above the bottom 10 of said outer casing 3 and constitute together with this bottom member two chambers serving as an extension of the receptacles 7 and 8 and separated by a partition 11. These two chambers are connected respectively with the passages 12 and 13 ending at their upper extremity in the valves 14 and 15 respectively for the inlet and outlet of gas, which are disposed in the distribution chamber 16 mounted on the horizontal wall 5.

Each of the bell shaped members 1 and 2 is subjected alternately to an upward and a downward thrust according as the gas, as determined by the position of the distributing members, is admitted under the bell shaped member through one of the jackets 7 and 8, or into the receptacle surrounding the same. By reason of these alternate and contrary impulsions, the two bell shaped members will move alternately upward or downward by pivoting about the two cross pins 17 to which said bell shaped members are connected by the arms 18 and 19 engaging the forked members 20, 21 secured to the upper part of the bell shaped members and extended by the rods 22, 23 entering the guides 24, 25 extending across the jackets 7 and 8.

Figure 4:
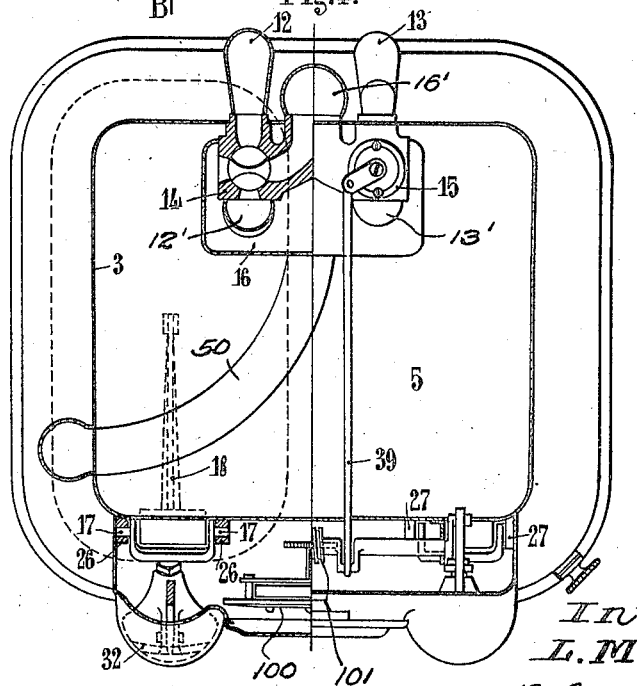
Fig. 4 shows horizontal sections on the lines C—C and D—D, Fig. 3.
Figure 5:
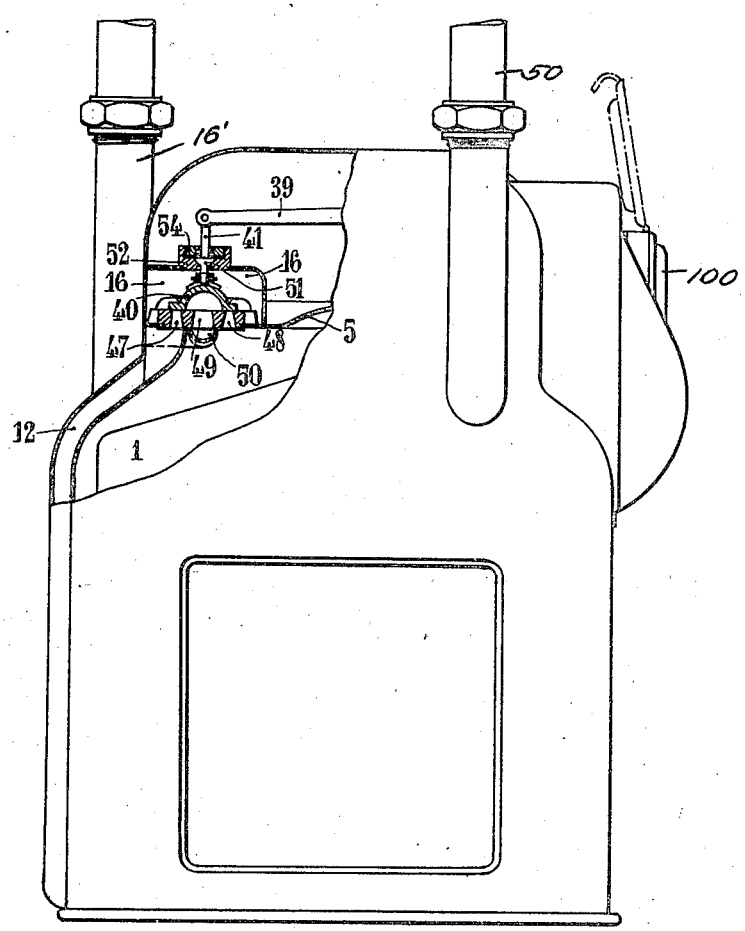
Fig. 5 shows the means according to this invention, as applicable to a gas meter in which the distributor is realized by the use of slide valves, the section of said meter being taken on the line E—E, Fig. 6.

The arms 18, 19 pass through the walls surrounding the bell shaped members. To this effect, said walls contain orifices having secured therein the members 26, 27 carrying the pivotation pintles for said arms. Within said members 26, 27, are disposed the flexible diaphragms 28 maintained against a shoulder 29 of said arms by means of a sleeve 30 submitted to the pressure of a nut 31. The counterweights 32, 33 mounted on the ends of the arms 18, 19, partake of the swinging movement of the two bell shaped members and are connected through the intermediary of the links 34, 35, to a shaft 38 to which they give a continuous rotary motion. The said shaft 38 is adapted to drive the recording or registering mechanism 100 and is connected therewith by a suitable driving gear, such, for instance, as a gear and worm drive as indicated at 101 in Fig. 4. The shaft 38 carries two cranks having disposed thereon two connecting rods 39 actuating respectively the two valves 14 and 15 of the gas inlet and outlet.

The chambers above the bells 1 and 2 communicate respectively with their distributor valves by passages 12' and 13' and the exhaust passage 50, which is adapted for connection with the gas consumption devices (not shown), communicates constantly with the distributor casing 16.

It will be understood from the preceding that each of the flexible membranes which is disposed for the purpose of forming a tight joint to close said orifice in the wall while at the same time yielding to the swinging movement of the arm, constitutes for this reason a hermetical separation preventing in an absolute and durable manner the receptacle having said bell shaped member moving therein from receiving gas or allowing it to escape therefrom otherwise than through the passage connecting the same with the inlet or the outlet through the intermediary of the distributing system. While one of the two chambers separated by the wall of the bell exhausts into the pipe 50, the other chamber receives gas through the pipe 16'.

On the other hand, inasmuch as the friction surfaces of the valves constitute in themselves a tight joint, the receptacle having moving therein the different members actuating the distributing device and the mechanism for recording the volume is completely protected from all contact with the gas and with the emanations from the liquid.

The distributing valves constitute a single unit that will not get out of shape and are so constructed as to allow no gripping to take place. Their movable portion, which is set in action by the movement of the bell shaped members and carefully adjusted by friction fit, is maintained in such manner that it can neither rise nor sink down, preserving all the necessary tightness while at the same time remaining sufficiently free to require only a small motive effort. It results that the said members thus protected from all attack will preserve their freedom of movement and are not subject to any abnormal resistance nor in consequence to any wear of the parts.

The valves are given an alternate rotary movement by means of the links 39 whereby the said valves are caused to regulate by means of suitable orifices or passages, the inlet of gas to and the outlet of gas from the apparatus in such manner that it shall effect the movement of the two bell shaped members each swinging movement whereof in one or the other direction corresponds to the passage of a determined volume of gas in the meter.

In the embodiment shown in Fig. 9, each of the valves is replaced by a slide valve 40 to which the rod 39 communicates its alternating movement through the intermediary of a link 41 pivoted upon a ball bearing whose special construction will be hereinafter set forth. Said link is secured by a pin 42 to a member 43 in the form of a yoke whose two branches which are engaged with the slide valve 40, terminate at their lower end in a toothed sector 44 engaged with a rack 45 disposed in each of the lateral walls of the slide valve 40. The reciprocating motion of the link 39 is transmitted in the same form and at a determined amplitude to the slide valve 40.

This latter is slidable upon a slideway 46 secured to the horizontal wall 5, within the distribution casing 16 and provided with the ports 47, 48, suitably spaced apart, admitting the gas contained in the casing 16, the port 47 acting as an inlet for the gas under the bell shaped member 1 through the passage 12 and the port 48 admitting the gas directly above the said bell shaped member. The slideway 46 is provided with a central port 49 which is in constant connection with the discharge passage 50. It will thus be observed that this distributor performs the same functions as the hereinbefore described valve. The gas is discharged through the passage 50 which is connected either with the port 47 or with the port 48 through the intermediary of the central port 49. The second distributor is identical in operation to the first.

The slide valve actuating device exerts a vertical pressure upon said valve in a downward direction, whereby it is constantly applied against said slideway. When compared with the other systems of slide valve distribution in which the actuating members exert an action parallel to the valve slideway, the present method has the advantage of affording an absolutely tight working. In fact, the slide valve is never subject to lifting, either by reason of any impurities being introduced between the slide valve and the slideway, which is now prevented by the pressure of said valve, or from any other cause. It is also quite evident that the gas entering the valve distribution chamber can in no wise escape from said chamber except through the distributor. For this reason it is indispensable that the actuating devices of each distributor shall be constructed in such manner as to obviate the use of stuffing boxes or any solution of continuity on the walls of the chamber traversed by said devices.

To this effect, the connecting rod 41 carries a hemispherical enlarged portion 51 acting as a ball and socket joint in cooperation with a holder 52 secured to the upper wall of the chamber 16 and provided with a spherical recess constituting a bearing surface. The tight working of the device is obtained by means of a flexible diaphragm 53 which is pressed on the one hand against the bottom of the holder 52 and on the other hand against the hemispherical portion 51 by means of a threaded ring constituting a nut in the holder 52 which is screw threaded for the purpose, and by means of a hemispherical member 55 disposed within a corresponding recess of the ring 54. The said member 55 is provided with an orifice at the center through which the rod 41 is caused to pass, this member being riveted to said rod and thus completing the ball and socket member constituted by the hemispherical enlarged portion 51, while at the same time securing the proper clamping of the flexible diaphragm 53.

Having now described my invention, what I claim as new and desire to secure by Letters Patent is:

1. A gas meter, a casing, means dividing said casing into three fluid tight compartments, certain of said compartments having sealing fluid therein, gas distributing and gas volume registering mechanisms arranged in one compartment, oscillating bells immersed in the sealing fluid in the other compartments and sub-dividing the latter into two gas receiving chambers, means to permit the inlet of gas, means to permit the outlet of gas, oscillating levers actuated by said bells and extended through the portion of the dividing means separating the last mentioned compartments from the first mentioned compartments, a fluid tight flexible diaphragm enclosing the levers at the points of extension through the dividing means, and means actuated by the levers to control the distributing mechanism whereby to connect one of the chambers of each of the last mentioned compartments with the gas inlet means simultaneously with the connection of the other chamber of said compartment with the gas outlet means and to alternately connect the first mentioned chamber with the gas outlet means, and the second mentioned chamber with the gas inlet means.

2. In a gas meter, a casing internally divided into a plurality of compartments, fluid sealed oscillating bells arranged in certain of the compartments, means permitting the inlet of gas, means permitting the outlet of gas, and a gas distributing mechanism arranged in another of said compartments and controlling the admission of gas from the gas inlet means to the compartments containing the bells and controlling the exhaust of gas from said compartments to the gas outlet means, said distributing mechanism comprising flat slide valves, ported seats for said valves, racks carried by said valves, a double gear segment meshing with the racks of each valve, a lever support for said double segment, a fluid-tight flexible member arranged at the pivotal axis of the lever, and means connecting the bells with the levers whereby to actuate the latter.

In testimony that I claim the foregoing as my invention, I have signed my name.

LAURENT MILLET.